(12) United States Patent
Kang et al.

(10) Patent No.: US 8,164,880 B2
(45) Date of Patent: Apr. 24, 2012

(54) DIELECTRIC CERAMIC COMPOSITION AND MULTILAYER CERAMIC CAPACITOR HAVING THE SAME

(75) Inventors: Sung Hyung Kang, Gyunggi-do (KR); Kang Heon Hur, Gyunggi-do (KR); Sang Hoon Kwon, Gyunggi-do (KR); Joon Yeob Cho, Seoul (KR); Sang Hyuk Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 21 days.

(21) Appl. No.: 12/859,630

(22) Filed: Aug. 19, 2010

(65) Prior Publication Data

US 2011/0157769 A1  Jun. 30, 2011

(30) Foreign Application Priority Data

Dec. 31, 2009 (KR) .................. 10-2009-0135118

(51) Int. Cl.
 *H01G 4/06* (2006.01)

(52) U.S. Cl. ............... 361/321.4; 361/321.1; 361/321.5; 361/311; 361/306.1; 361/306.3; 501/135; 501/138; 501/139

(58) Field of Classification Search ........... 361/321.4, 361/321.1, 321, 2, 321.5, 311–313, 306.1, 361/306.3, 303–305; 501/135, 136, 138, 501/139
See application file for complete search history.

(56) References Cited

U.S. PATENT DOCUMENTS

| 5,250,481 | A | | 10/1993 | Park | |
|---|---|---|---|---|---|
| 6,058,005 | A | * | 5/2000 | Matoba et al. | 361/321.4 |
| 6,233,134 | B1 | * | 5/2001 | Sakamoto et al. | 361/311 |
| 7,312,172 | B2 | * | 12/2007 | Sasaki et al. | 501/136 |
| 7,381,671 | B2 | * | 6/2008 | Ogiso | 501/135 |
| 7,397,649 | B2 | * | 7/2008 | Muto et al. | 361/321.4 |
| 7,727,921 | B2 | * | 6/2010 | Takeda | 501/135 |
| 7,751,178 | B2 | * | 7/2010 | Suzuki | 361/321.4 |
| 2002/0072464 | A1 | | 6/2002 | Nakamura et al. | |
| 2003/0054942 | A1 | | 3/2003 | Saito et al. | |
| 2003/0199385 | A1 | | 10/2003 | Kamiya et al. | |
| 2007/0142210 | A1 | | 6/2007 | Muto et al. | |
| 2007/0287625 | A1 | | 12/2007 | Yanagida et al. | |

FOREIGN PATENT DOCUMENTS

| JP | 2000-058378 A | 2/2000 |
|---|---|---|
| JP | 2002-201065 | 7/2002 |
| JP | 2002-284572 | 10/2002 |
| JP | 2002-293627 | 10/2002 |
| JP | 2003-277156 | 10/2003 |
| JP | 2007-331956 | 12/2007 |

(Continued)

OTHER PUBLICATIONS

Korean Office Action, with English translation, issued in Korean Patent Application No. 10-2009-0135118, dated Jun. 24, 2011.

(Continued)

*Primary Examiner* — Nguyen T Ha
(74) *Attorney, Agent, or Firm* — McDermott Will & Emery LLP

(57) ABSTRACT

There is provided a dielectric ceramic composition including a base powder expressed by a composition formula of $Ba_m(Ti_{1-x}Zr_x)O_3$, where $0.995 \leq m \leq 1.010$ and $0 < x \leq 0.10$, and first to fifth accessory components, and a multilayer ceramic capacitor having the same. The multilayer ceramic capacitor having the dielectric ceramic composition has a high dielectric constant and superior high-temperature reliability.

11 Claims, 1 Drawing Sheet

FOREIGN PATENT DOCUMENTS

| | | |
|---|---|---|
| JP | 2008-207971 | 9/2008 |
| JP | 2009-084111 A | 4/2009 |
| KR | 1993-0014640 A | 7/1993 |
| KR | 10-2007-0039139 A | 4/2007 |

OTHER PUBLICATIONS

Japanese Office Action, and English translation thereof, issued in Japanese Patent Application No. 2010-186182 dated Jan. 31, 2012.

* cited by examiner

A-A'

DIELECTRIC CERAMIC COMPOSITION AND MULTILAYER CERAMIC CAPACITOR HAVING THE SAME

CROSS-REFERENCE TO RELATED APPLICATIONS

This application claims the priority of Korean Patent Application No. 10-2009-0135118 filed on Dec. 31, 2009, in the Korean Intellectual Property Office, the disclosure of which is incorporated herein by reference.

BACKGROUND OF THE INVENTION

1. Field of the Invention

The present invention relates to a dielectric ceramic composition and a multilayer ceramic capacitor having the same, and more particularly, to a dielectric ceramic composition having a high dielectric constant and superior high-temperature reliability and a multilayer ceramic capacitor having the same.

2. Description of the Related Art

In general, ceramic electronic components using ceramic materials, for example, capacitors, inductors, piezoelectric devices, varistors, or thermistors, include a ceramic sintered body made of ceramic materials, inner electrodes provided inside the ceramic sintered body, and outer electrodes provided on the surfaces of the ceramic sintered body to contact the inner electrodes.

As one of various ceramic electronic components, a multilayer ceramic capacitor includes a plurality of stacked dielectric layers, inner electrodes facing each other in which each pair of inner electrodes has one of the dielectric layers interposed therebetween, and outer electrodes electrically connected to the inner electrodes.

Multilayer ceramic capacitors are being widely used in mobile communications devices, such as laptop computers, PDAs mobile phones and the like, due to their compactness, high capacitance and ease of mounting.

A multi-layer ceramic capacitor is usually manufactured by stacking a paste for inner electrodes and a paste for dielectric layers using a sheet method, a printing method, or the like and co-firing the stack.

When a dielectric material used in a conventional multilayer ceramic capacitor is fired in a reduction atmosphere, it is reduced to thereby have semiconductive properties. For this reason, a material used for inner electrodes employs precious metals such as Pd that are not melted at a sintering temperature of the dielectric material and are not oxidized even when fired under the condition of high oxygen partial pressure, the condition in which the dielectric material is not to be semiconductive.

However, since precious metals such as Pd are expensive, this disturbs the achievement of low manufacturing costs of multilayer ceramic capacitors. Therefore, a base metal such as Ni or a Ni alloy, which is relatively cheap, is mainly used as a material for the inner electrodes. However, in the case where the base metal is used as a conductive material for the inner electrodes, when firing is performed at the ambient temperature, the inner electrodes are oxidized. Therefore, the co-firing of the dielectric layers and the inner electrodes are required to be performed in a reduction atmosphere.

However, when the firing is performed in a reduction atmosphere, the dielectric layers are reduced to thereby decrease insulation resistance (IR). Accordingly, a non-reducing dielectric material is being proposed. Also, there is an increase in demand for a dielectric ceramic composition for temperature compensation which has a small temperature coefficient of capacitance (TCC) and is controllable in the range of approximately −150 ppm/° C. and +150 ppm/° C.

SUMMARY OF THE INVENTION

An aspect of the present invention provides a dielectric ceramic composition having a high dielectric constant and superior high-temperature reliability and a multilayer ceramic capacitor having the same.

According to an aspect of the present invention, there is provided a dielectric ceramic composition including: a base powder expressed by a composition formula of $Ba_m(Ti_{1-x}Zr_x)O_3$, where $0.995 \leq m \leq 1.010$ and $0 < x \leq 0.10$; a first accessory component being an oxide or a carbide including at least one of Mg, Sr, Ba and Zr, in a range of approximately 0.05 mol to 6.00 mol per 100 mol of the base powder; a second accessory component being an oxide including at least one of Sc, Y, La, Ac, Ce, Pr, Nd, Pm, Sm, Eu, Gd, Tb, Dy, Ho, Er, Tm, Yb and Lu, in a range of approximately 0.20 mol to 3.00 mol per 100 mol of the base powder; a third accessory component being an oxide including at least one of Cr, Mo, W, Mn, Fe, Co and Ni, in a range of approximately 0.05 mol to 0.50 mol per 100 mol of the base powder; a fourth accessory component being an oxide including at least one of V, Nb and Ta, in a range of approximately 0.05 mol to 0.35 mol per 100 mol of the base powder; and a fifth accessory component being an oxide including at least one of Si and Al, in a range of approximately 0.50 mol to 4.00 mol per 100 mol of the base powder.

A content ratio of the fifth accessory component to the first accessory component may be in a range of approximately 0.75 to 1.50.

A content of the third and fourth accessory components may be approximately 0.1 mol to 0.8 mol per 100 mol of the base powder.

At least one of the first to fifth accessory components may have a specific surface area equal to or greater than $2.0 \, m^2/g$.

The first and fifth accessory components may be added in a compound form.

According to another aspect of the present invention, there is provided a multilayer ceramic capacitor including: a ceramic sintered body having a dielectric layer and first and second inner electrodes alternately stacked therein; and first and second outer electrodes provided at both ends of the ceramic sintered body and electrically connected to the first and second inner electrodes, wherein the dielectric layer includes: a base powder expressed by a composition formula of $Ba_m(Ti_{1-x}Zr_x)O_3$, where $0.995 \leq m \leq 1.010$ and $0 < x \leq 0.10$; a first accessory component being an oxide or a carbide including at least one of Mg, Sr, Ba and Zr, in a range of approximately 0.05 mol to 6.00 mol per 100 mol of the base powder; a second accessory component being an oxide including at least one of Sc, Y, La, Ac, Ce, Pr, Nd, Pm, Sm, Eu, Gd, Tb, Dy, Ho, Er, Tm, Yb and Lu, in a range of approximately 0.20 mol to 3.00 mol per 100 mol of the base powder; a third accessory component being an oxide including at least one of Cr, Mo, W, Mn, Fe, Co and Ni, in a range of approximately 0.05 mol to 0.50 mol per 100 mol of the base powder; a fourth accessory component being an oxide including at least one of V, Nb and Ta, in a range of approximately 0.05 mol to 0.35 mol per 100 mol of the base powder; and a fifth accessory component being an oxide including at least one of Si and Al, in a range of approximately 0.50 mol to 4.00 mol per 100 mol of the base powder.

The first and second inner electrodes may include Ni or a Ni alloy.

A content ratio of the fifth accessory component to the first accessory component may be in a range of approximately 0.75 to 1.50.

A content of the third and fourth accessory components may be approximately 0.1 mol to 0.8 mol per 100 mol of the base powder.

At least one of the first to fifth accessory components may have a specific surface area equal to or greater than 2.0 m²/g.

The first and fifth accessory components may be added in a compound form.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
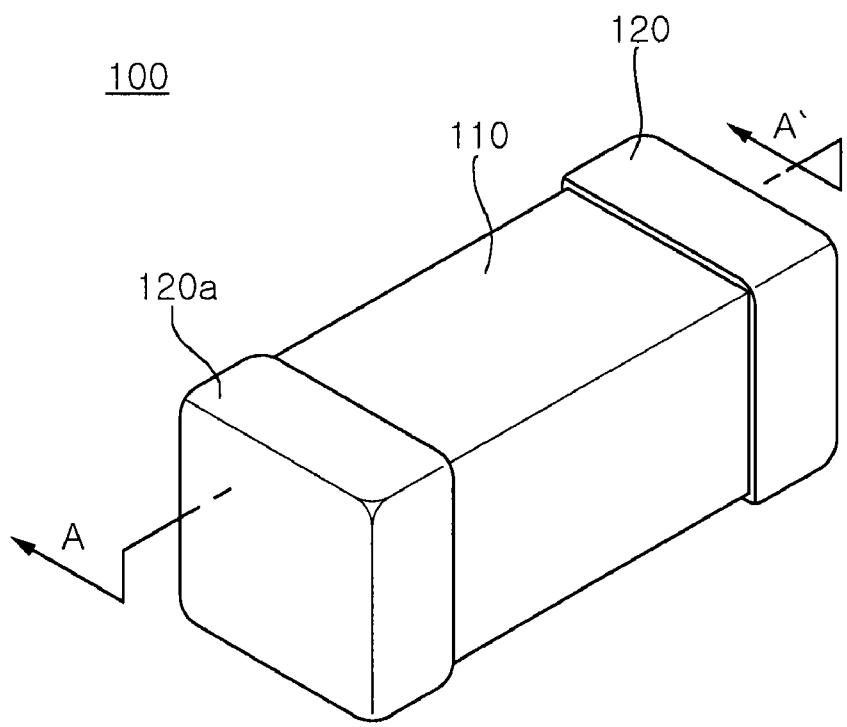
FIG. 1 is a schematic perspective view illustrating a multilayer ceramic capacitor according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. It should be considered that the shapes and dimensions of elements in the drawings may be exaggerated for clarity. Throughout the drawings, the same reference numerals will be used to designate the same or like elements.

An aspect of the present invention provides a dielectric ceramic composition. Examples of electronic components having a dielectric ceramic composition include capacitors, inductors, piezoelectric devices, varistors, thermistors, or the like. Hereinafter, as an example of these electronic components, a multilayer ceramic capacitor will be described in detail.

Figure 2:
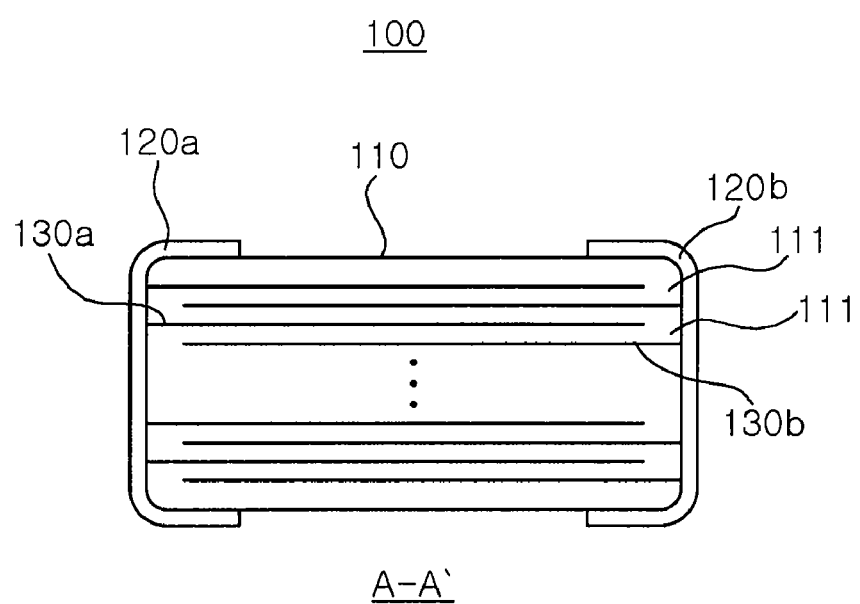
FIG. 2 is a schematic cross-sectional view illustrating the multilayer ceramic capacitor of FIG. 1, taken along line A-A'.

FIG. 1 is a schematic perspective view illustrating a multilayer ceramic capacitor according to an exemplary embodiment of the present invention. FIG. 2 is a schematic cross-sectional view illustrating the multilayer ceramic capacitor of FIG. 1, taken along line A-A'.

With reference to FIGS. 1 and 2, a multilayer ceramic capacitor 100 according to an exemplary embodiment of the invention includes a ceramic sintered body 110 having a dielectric layer 111 and first and second inner electrodes 130a and 130b alternately stacked therein, and first and second outer electrodes 120a and 120b formed at both ends of the ceramic sintered body 110 such that they are connected to the first and second inner electrodes 130a and 130b alternately disposed inside the ceramic sintered body 110.

The shape of the ceramic sintered body 110 is not particularly limited, but may generally be a rectangular parallelepiped. Also, the size of the ceramic sintered body 110 is not particularly limited, and may be properly determined according to use. For example, the size thereof may be (0.6~5.6 mm)×(0.3~5.0 mm)×(0.3~1.9 mm).

The thickness of the dielectric layer 111 may be variable according to designs for desired capacitance of the multilayer ceramic capacitor 100. In this embodiment, the thickness of the dielectric layer 111, after being fired, may be 0.2 μm or greater. Since a very thin active layer has a small number of crystal grains that are present in a single layer and has a bad effect on reliability, the thickness of the dielectric layer 111 may be 0.2 μm or greater The first and second inner electrodes 130a and 130b are stacked in such a manner that their respective ends are alternately exposed to the surfaces of the opposing ends of the ceramic sintered body 110. The first and second outer electrodes 120a and 120b are formed at both ends of the ceramic sintered body 110 in such a manner that they are electrically connected to the exposed ends of the first and second inner electrodes 130a and 130b alternately arranged. In this manner, a capacitor circuit is formed.

A conductive material contained in the first and second inner electrodes 130a and 130b may be, but is not particularly limited to, a base metal, since the material of the dielectric layer 111 has non-reducible properties.

Examples of a base metal used as a conductive material may be Ni or a Ni alloy. The Ni alloy may be an alloy of Ni and at least one element selected from the group consisting of Mn, Cr, Co and Al. In the Ni alloy, a content of Ni may be 95% or greater by weight.

The thickness of the first and second inner electrodes 130a and 130b may be properly determined according to use. For example, the thickness thereof may range from 0.1 μm to 5 μm or from 0.1 μm to 2.5 μm.

A conductive material contained in the first and second outer electrodes 120a and 120b may be, but is not particularly limited to, Ni, Cu or an alloy thereof. The thickness of the first and second outer electrodes 120a and 120b may be properly determined according to use. For example, the thickness thereof may range from 10 μm to 50 μl.

The dielectric layer 111 included in the ceramic sintered body 110 may contain a dielectric ceramic composition according to an embodiment of the present invention.

A dielectric ceramic composition according to an exemplary embodiment of the invention includes a base powder expressed by $Ba_m(Ti_{1-x}Zr_x)O_3$, where $0.995 \leq m \leq 1.010$ and $0 < x \leq 0.10$ are satisfied, and first to fifth accessory components.

The dielectric ceramic composition according to this embodiment allows for a high dielectric constant and high-temperature reliability as well as the capability of being fired at a low temperature in a reduction atmosphere, whereby Ni inner electrodes may be used.

Hereinafter, each component contained in a dielectric ceramic composition according to an exemplary embodiment of the invention will be described in detail.

a) $Ba_m(Ti_{1-x}Zr_x)O_3$

In an exemplary embodiment of the invention, there is provided a dielectric ceramic composition including a base powder expressed by $Ba_m(Ti_{1-x}Zr_x)O_3$, where $0.995 \leq m \leq 1.010$ and $0 < x \leq 0.10$ are satisfied. In the above composition formula, when m is less than 0.995, reduction may be easily caused during a firing process in a reduction atmosphere, whereby the dielectric ceramic composition may be changed to a semiconductive material. When m exceeds 1.010, a firing temperature may be increased. In this composition formula, when x exceeds 0.10, desired temperature characteristics may be not satisfied.

b) First Accessory Component

In an exemplary embodiment of the invention, there is provided a dielectric ceramic composition including an oxide or a carbide containing at least one of Mg, Sr, Ba and Zr as a first accessory component. The first accessory component contributes to the non-reducible properties, grain growth control and the sintering stability of the dielectric ceramic composition.

The content of the first accessory component is approximately 0.05 mol to 6.00 mol per 100 mol of base powder. When the content of the first accessory component is less than 0.05 mol, reduction may be easily caused during a firing process in a reduction atmosphere and grain growth control may be difficult. When the content of the first accessory component exceeds 6.00 mol, a sintering temperature may be increased and a desired dielectric constant value may be difficult to obtain.

c) Second Accessory Component

In an exemplary embodiment of the invention, there is provided a dielectric ceramic composition including an oxide containing at least one of Sc, Y, La, Ac, Ce, Pr, Nd, Pm, Sm, Eu, Gd, Tb, Dy, Ho, Er, Tm, Yb and Lu as a second accessory component. The second accessory component contributes to the improvement of high-temperature accelerated life properties and the stabilization of capacitance change at a temperature equal to or greater than a curie temperature Tc, whereby desired temperature characteristics may be satisfied.

The content of the second accessory component is approximately 0.2 mol to 3.0 mol per 100 mol of base powder. When the content of the second accessory component is less than 0.2 mol, high-temperature accelerated life properties may be deteriorated and a temperature coefficient of capacitance (TCC) may be unstable. When the content of the second accessory component exceeds 3.0 mol, a sintering temperature may be increased and a desired dielectric constant value may be difficult to obtain. Also, reliability may be degraded due to second-order phase transition.

d) Third Accessory Component

In an exemplary embodiment of the invention, there is provided a dielectric ceramic composition including an oxide containing at least one of Cr, Mo, W, Mn, Fe, Co and Ni as a third accessory component. The third accessory component contributes to an increase of insulation resistance IR and the improvement of high-temperature accelerated life properties.

The content of the third accessory component is approximately 0.05 mol to 0.50 mol per 100 mol of base powder. When the content of the third accessory component is less than 0.05 mol, the high-temperature accelerated life properties may be deteriorated and a TCC may be unstable. When the content of the third accessory component exceeds 0.05 mol, a value of Capacitance*Resistance (C*R) may be decreased and capacitance change according to time may be increased.

e) Fourth Accessory Component

In an exemplary embodiment of the invention, there is provided a dielectric ceramic composition including an oxide containing at least one of V, Nb and Ta as a fourth accessory component. The fourth accessory component contributes to the improvement of high-temperature accelerated life properties and the stabilization of capacitance change at a temperature equal to or greater than a curie temperature Tc.

The content of the fourth accessory component is approximately 0.05 mol to 0.35 mol per 100 mol of base powder. When the content of the fourth accessory component is less than 0.05 mol, high-temperature accelerated life properties may be deteriorated. When the content of the fourth accessory component exceeds 0.35 mol, a value of C*R may be decreased.

Also, the content of the third and fourth accessory components may be 0.1 mol to 0.8 mol per 100 mol of base powder. When the content of the third and fourth accessory components is less than 0.1 mol, grain growth control may be difficult and high-temperature accelerated life properties may be deteriorated. When the content of the third and fourth accessory components exceeds 0.8 mol, capacitance change according to time may be increased and a value of C*R may be decreased.

f) Fifth Accessory Component

In an exemplary embodiment of the invention, there is provided a dielectric ceramic composition including an oxide containing at least one of Si and Al as a fifth accessory component. The fifth accessory component contributes to sintering properties by reacting to the other components, especially, a first accessory component or base powder.

The content of the fifth accessory component is approximately 0.5 mol to 4.0 mol per 100 mol of base powder. When the content of the fifth accessory component is less than 0.5 mol, a firing temperature may be increased. When the content of the fifth accessory component exceeds 4.0 mol, grain growth control may be difficult and a desired dielectric constant value may be difficult to obtain.

Also, a content ratio of the fifth accessory component to the first accessory component may be in a range of 0.75 to 1.50. When the content ratio of the fifth accessory component to the first accessory component is less than 0.75, a sintering temperature may be decreased, but high-temperature accelerated life properties may be deteriorated and the sintering temperature may become unstable. Also, when the content ratio of the fifth accessory component to the first accessory component exceeds 1.50, the sintering temperature may be increased.

Also, the first and fifth accessory components may be added in a compound form. When the first accessory component is represented as $MO_a$ or $MCO_b$ (where M is at least one of Mg, Sr, Ba and Zr) and the fifth accessory component is represented as $NO_c$ (where N is at least one of Si and Al), they may be added in a glass form such as $M-NO_c$ or $MO_a-NO_c$. Here, the content ratio of the fifth accessory component to the first accessory component in that compound may be in a range of 0.75 to 1.50.

Also, when the first to fifth accessory components are mixed with the base powder, their individual specific surface areas may be equal to or greater than 2.0 $m^2/g$.

Hereinafter, inventive and comparative examples of the invention will be more fully described. These examples are provided to assist in a comprehensive understanding of the invention, and should not be construed as being limited to the examples set forth herein.

INVENTIVE EXAMPLE

A slurry was prepared by mixing material powder, based on the composition and content as described in Table 1 below, with ethanol/toluene, a dispersing agent and a binder using zirconia balls as mix/dispersion media, and subsequently performing a ball milling process for twenty hours. The mixed slurry was then made into a sheet having a thickness of approximately 2.0 μm and a sheet having a thickness of approximately 10 μm to 13 μm by using a small coater through a doctor-blade method.

A Ni inner electrode was printed onto the sheet of approximately 2.0 μm to thereby form an active layer. As for upper and lower cover layers, the sheet of approximately 10 μm to 13 μm was stacked so as to have a thickness of twenty-five layers. Those sheets were stacked to form a bar. A compression bar was cut into chips having a 3216 size by a cutter. The chip was plasticized and subsequently fired at a temperature of approximately 1100° C. to 1250° C. in a reduction atmosphere for two hours, and was then subjected to heat treatment at a temperature of approximately 1000° C. for three hours for reoxidation. The fired chip was subjected to a termination process and was then left for twenty-four hours. Then, the characteristics of the chip were measured as described below.

TABLE 1

| | x | First Accessory Component (mole) | Second Accessory Component (mole) | Third Accessory Component (mole) | Fourth Accessory Component (mole) | Fifth Accessory Component (mole) | First Accessory Component/Fifth Accessory Component (mole) | Third Accessory Component + Fourth Accessory Component (mole) |
|---|---|---|---|---|---|---|---|---|
| Inventive Example 1 | 0.003 | Mg 0.7 Ba 1.2 | Dy 0.4 | Mn 0.1 Cr 0.2 | V 0.3 | Si 1.5 Al 0.1 | 1.18 | 0.6 |
| Inventive Example 2 | 0.040 | Mg 1.2 Ba 2.5 | Y 0.1 Yb 0.1 Dy 0.4 | Mn 0.1 Cr 0.1 | Nb 0.1 V 0.10 | Si 2.5 | 1.48 | 0.4 |
| Inventive Example 3 | 0.005 | Mg 0.6 Ba 1.1 | Dy 1.5 | Mo 0.2 | Nb 0.3 | Si 2.2 | 0.77 | 0.5 |
| Inventive Example 4 | 0.001 | Mg 1.0 Ba 1.0 | Dy 1.0 | Mn 0.1 | V 0.1 | Si 1.2 Al 0.5 | 1.17 | 0.2 |
| Comparative Example 1 | 0.110 | Mg 0.7 Ba 1.2 | Dy 0.4 | Mn 0.1 Cr 0.2 | V 0.3 | Si 1.5 Al 0.1 | 1.18 | 0.6 |
| Comparative Example 2 | 0 | Mg 2.0 Ba 4.7 | Y 2.5 Yb 1.5 | Mo 0.1 | V 0.3 | Si 3.5 Al 0.5 | 1.65 | 0.4 |
| Comparative Example 3 | 0.002 | Mg 0.5 Ba 4.5 | Dy 0.5 | Mn 0.3 | V 0.3 | Si 4.0 | 1.25 | 0.6 |
| Comparative Example 4 | 0.010 | Mg 1.7 Ba 2.5 | Dy 1.0 | Mn 0.5 Cr 0.1 | Nb 0.1 | Si 2.5 Al 2.0 | 0.93 | 0.7 |
| Comparative Example 5 | 0.020 | Mg 2.0 Ba 1.0 Ca 1.0 | Y 2.5 Yb 0.5 | Mn 0.2 Cr 0.2 Mo 0.05 | — | Si 2.9 Al 0.1 | 1.33 | 0.4 |
| Comparative Example 6 | 0.023 | Mg 1.0 Ba 5.0 | Y 1.0 Yb 2.0 | Mn 0.2 Cr 0.1 Mo 0.05 | Nb 0.1 | Si 4.0 Al 0.5 | 1.33 | 0.45 |
| Comparative Example 7 | 0.008 | — | Y 1.0 | Mn 0.1 Cr 0.2 | V 0.3 | Si 3.5 Al 0.5 | — | 0.6 |
| Comparative Example 8 | 0.004 | Mg 0.5 Ba 3.0 | Dy 0.1 | Mn 0.5 Cr 0.15 Mo 0.05 | Ta 0.1 V 0.1 | Si 3.0 Al 0.5 | 1.00 | 0.45 |
| Comparative Example 9 | 0.006 | Mg 1.0 Ba 5.5 | Yb 2.5 Dy 0.5 | — | Nb 0.1 Ta 0.1 | Si 2.5 Al 2.0 | 1.33 | 0.2 |
| Comparative Example 10 | 0.001 | Mg 2.0 Ba 2.0 | Y 2.5 Yb 0.5 | Mn 0.2 Cr 0.2 Mo 0.05 | Ta 0.5 | Si 2.9 Al 0.1 | 1.33 | 0.5 |
| Comparative Example 11 | 0.02 | Mg 0.4 Ba 0.1 | Dy 2.0 | Mn 0.2 Cr 0.1 Mo 0.05 | Nb 0.1 | Si 0.4 | 1.25 | 0.45 |

[Evaluation]

The room temperature capacitance C and the dielectric loss of the chip were measured using a LCR meter under conditions of 1 kHz and 1 V. By taking ten samples, the room temperature insulation resistance thereof was measured after DC 50V was applied thereto for sixty seconds. The TCC was measured in a range of approximately −55° C. to 125° C. High-temperature reliability was evaluated through a high-temperature IR voltage-boost test performed under conditions of 125° C. and 1 Vr=7.5V/μm. The results are listed in Table 2 below.

TABLE 2

| | Dielectric Constant | 85 TCC[%] | 125 TCC[%] | High-Temperature Accelerated Life | Value of C*R | Sintering Temperature ( ) |
|---|---|---|---|---|---|---|
| Inventive Example 1 | 2808 | −12 | −30 | 5 Vr | 1221 | 1200 |
| Inventive Example 2 | 2131 | −4 | −12 | 6 Vr | 2101 | 1230 |
| Inventive Example 3 | 2309 | −4 | −13 | 4 Vr | 1853 | 1190 |
| Inventive Example 4 | 2651 | −7 | −15 | 5 Vr | 2222 | 1200 |
| Comparative Example 1 | 2752 | −15 | −31 | 6 Vr | 1520 | 1190 |
| Comparative Example 2 | 1950 | −5 | −10 | 4 Vr | 2311 | 1260 |
| Comparative Example 3 | 2009 | −9 | −15 | 6 Vr | 2001 | 1260 |
| Comparative Example 4 | 2010 | −1 | −9 | 3 Vr | 401 | 1240 |
| Comparative Example 5 | 2180 | −5 | −15 | 1 Vr | 899 | 1240 |
| Comparative Example 6 | 2011 | 1 | −2 | 2 Vr | 2213 | 1280 |

TABLE 2-continued

|  | Dielectric Constant | 85 TCC[%] | 125 TCC[%] | High-Temperature Accelerated Life | Value of C*R | Sintering Temperature ( ) |
|---|---|---|---|---|---|---|
| Comparative Example 7 | 2600 | −20 | −35 | 1 Vr | 522 | 1180 |
| Comparative Example 8 | 2304 | −3 | −10 | 1 Vr | 612 | 1230 |
| Comparative Example 9 | 2111 | −2 | −8 | 1 Vr | 1095 | 1240 |
| Comparative Example 10 | 1998 | −4 | 6 | 1 Vr | 182 | 1220 |
| Comparative Example 11 | 2206 | −6 | −18 | 1 Vr | 2213 | 1250 |

With reference to inventive examples 1 to 4, when the content of the first accessory component per 100 mol of the base powder was less than 0.05 mol, reduction was easily caused during the firing process in the reduction atmosphere and grain growth control was difficult. When the content of the first accessory component exceeded 6.00 mol, the firing temperature was increased and a desired dielectric constant value was not obtained. When the content of the second accessory component was less than 0.20 mol, high-temperature accelerated life properties were deteriorated and the TCC was unstable. When the content of the second accessory component exceeded 3.00 mol, the sintering temperature was increased and a desired dielectric constant was not obtained. When the content of the third accessory component was less than 0.05 mol, the high-temperature accelerated life properties was deteriorated and the TCC was unstable. When the content of the third accessory component exceeded 0.50 mol, the value of C*R was decreased. When the content of the fourth accessory component was less than 0.05 mol, the high-temperature accelerated life properties was deteriorated. When the content of the fourth accessory component exceeded 0.35 mol, the value of C*R was decreased. When the content of the fifth accessory component was less than 0.5 mol, the firing process was performed at a temperature higher than a desired temperature. When the content of the fifth accessory component exceeded 4.0 mol, the grain growth control was difficult.

As set forth above, according to exemplary embodiments of the invention, a dielectric ceramic composition allows for a high dielectric constant and high-temperature reliability as well as the capability of being fired at a low temperature in a reduction atmosphere, whereby Ni inner electrodes may be used A dielectric ceramic composition according to exemplary embodiments of the invention may be applicable to electronic components such as capacitors, inductors, piezoelectric devices, varistors, or thermistors.

While the present invention has been shown and described in connection with the exemplary embodiments, it will be apparent to those skilled in the art that modifications and variations can be made without departing from the spirit and scope of the invention as defined by the appended claims.

What is claimed is:

1. A dielectric ceramic composition comprising:
   a base powder expressed by a composition formula of $Ba_m(Ti_{1-x}Zr_x)O_3$, where $0.995 \leq m \leq 1.010$ and $0 < x \leq 0.10$;
   a first accessory component being an oxide or a carbide including at least one of Mg, Sr, Ba and Zr, in a range of approximately 0.05 mol to 6.00 mol per 100 mol of the base powder;
   a second accessory component being an oxide including at least one of Sc, Y, La, Ac, Ce, Pr, Nd, Pm, Sm, Eu, Gd, Tb, Dy, Ho, Er, Tm, Yb and Lu, in a range of approximately 0.20 mol to 3.00 mol per 100 mol of the base powder;
   a third accessory component being an oxide including at least one of Cr, Mo, W, Mn, Fe, Co and Ni, in a range of approximately 0.05 mol to 0.50 mol per 100 mol of the base powder;
   a fourth accessory component being an oxide including at least one of V, Nb and Ta, in a range of approximately 0.05 mol to 0.35 mol per 100 mol of the base powder; and
   a fifth accessory component being an oxide including at least one of Si and Al, in a range of approximately 0.50 mol to 4.00 mol per 100 mol of the base powder.

2. The dielectric ceramic composition of claim 1, wherein a content ratio of the fifth accessory component to the first accessory component is in a range of approximately 0.75 to 1.50.

3. The dielectric ceramic composition of claim 1, wherein a content of the third and fourth accessory components is approximately 0.1 mol to 0.8 mol per 100 mol of the base powder.

4. The dielectric ceramic composition of claim 1, wherein at least one of the first to fifth accessory components has a specific surface area equal to or greater than $2.0 \text{ m}^2/\text{g}$.

5. The dielectric ceramic composition of claim 1, wherein the first and fifth accessory components are added in a compound form.

6. A multilayer ceramic capacitor comprising:
   a ceramic sintered body having a dielectric layer and first and second inner electrodes alternately stacked therein; and
   first and second outer electrodes provided at both ends of the ceramic sintered body and electrically connected to the first and second inner electrodes,
   wherein the dielectric layer comprising:
   a base powder expressed by a composition formula of $Ba_m(Ti_{1-x}Zr_x)O_3$, where $0.995 \leq m \leq 1.010$ and $0 < x \leq 0.10$;
   a first accessory component being an oxide or a carbide including at least one of Mg, Sr, Ba and Zr, in a range of approximately 0.05 mol to 6.00 mol per 100 mol of the base powder;
   a second accessory component being an oxide including at least one of Sc, Y, La, Ac, Ce, Pr, Nd, Pm, Sm, Eu, Gd, Tb, Dy, Ho, Er, Tm, Yb and Lu, in a range of approximately 0.20 mol to 3.00 mol per 100 mol of the base powder;

a third accessory component being an oxide including at least one of Cr, Mo, W, Mn, Fe, Co and Ni, in a range of approximately 0.05 mol to 0.50 mol per 100 mol of the base powder;

a fourth accessory component being an oxide including at least one of V, Nb and Ta, in a range of approximately 0.05 mol to 0.35 mol per 100 mol of the base powder; and a fifth accessory component being an oxide including at least one of Si and Al, in a range of approximately 0.50 mol to 4.00 mol per 100 mol of the base powder.

7. The multilayer ceramic capacitor of claim 6, wherein the first and second inner electrodes include Ni or a Ni alloy.

8. The multilayer ceramic capacitor of claim 6, wherein a content ratio of the fifth accessory component to the first accessory component is in a range of approximately 0.75 to 1.50.

9. The multilayer ceramic capacitor of claim 6, wherein a content of the third and fourth accessory components is approximately 0.1 mol to 0.8 mol per 100 mol of the base powder.

10. The multilayer ceramic capacitor of claim 6, wherein at least one of the first to fifth accessory components has a specific surface area equal to or greater than $2.0 \text{ m}^2/\text{g}$.

11. The multilayer ceramic capacitor of claim 6, wherein the first and fifth accessory components are added in a compound form.

* * * * *